(12) United States Patent
Mårtensson et al.

(10) Patent No.: US 6,442,377 B1
(45) Date of Patent: Aug. 27, 2002

(54) RADIO TELEPHONE WITH HIGH ANTENNA EFFICIENCY

(75) Inventors: Dag Johan Fredrik Mårtensson, Flyinge; Hans Kenneth Håkansson, Malmö; Zhinong Ying, Lund, all of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 08/962,689

(22) Filed: Nov. 3, 1997

(30) Foreign Application Priority Data

Nov. 4, 1996 (SE) ............................................. 9604016

(51) Int. Cl.⁷ ................................................ H04B 1/38
(52) U.S. Cl. .................. 455/90; 455/128; 455/300; 455/347; 379/428.01; 379/433.01; 379/437; 379/451; 343/841
(58) Field of Search .......................... 455/90, 300, 128, 455/129, 301, 347, 117; 379/433.01, 428.01, 447, 110, 437, 451; 343/702, 841

(56) References Cited

U.S. PATENT DOCUMENTS

| | | | | |
|---|---|---|---|---|
| 5,189,632 A | * | 2/1993 | Paajanen et al. | 379/110 |
| 5,335,366 A | * | 8/1994 | Daniels | 455/90 |
| 5,440,317 A | * | 8/1995 | Jalloul et al. | 343/702 |
| 5,493,704 A | | 2/1996 | Grangeat et al. | |
| 5,526,411 A | * | 6/1996 | Krieter | 379/433 |
| 5,606,733 A | * | 2/1997 | Kanayama et al. | 455/90 |
| 5,787,340 A | * | 7/1998 | Sepponen | 455/90 |
| 5,819,162 A | * | 10/1998 | Spann et al. | 455/90 |

FOREIGN PATENT DOCUMENTS

| | | |
|---|---|---|
| DE | 43 00 705 | 7/1993 |
| EP | 689 297 | 12/1995 |
| JP | 07111411 | 4/1995 |
| JP | 7212 822 | 11/1995 |
| JP | 7123 463 | 12/1995 |
| WO | WO94/26000 | 11/1994 |
| WO | WO95/31048 | 11/1995 |

* cited by examiner

Primary Examiner—William Trost
Assistant Examiner—Simon Nguyen
(74) Attorney, Agent, or Firm—Burns, Doane, Swecker & Mathis, L.L.P.

(57) ABSTRACT

A radio telephone, preferably intended for cellular telecommunication, has an apparatus housing (20) and at least one antenna (21), which is mounted to or in connection with the apparatus housing for performing the wireless communication of the radio telephone by transmitting and receiving radiofrequent electromagnetic waves in a given wavelength range. A current-reducing means (30, 31) is mounted to the apparatus housing (20) between the antenna (21) and a side (23) of the radio telephone, which during normal use faces a human user (1). The means has conductive as well as dielectric properties and is arranged to reduce or eliminate electric currents present in and/or on the apparatus housing (20) between the antenna (21) and said side (23) of the radio telephone.

4 Claims, 3 Drawing Sheets

RADIO TELEPHONE WITH HIGH ANTENNA EFFICIENCY

TECHNICAL FIELD

The present invention relates to a radio telephone, preferably for use in cellular telecommunications, comprising an apparatus housing and at least one antenna, which is mounted on or in connection with the apparatus housing for performing the wireless communication of the radio telephone by transmitting and receiving radiofrequent electromagnetic waves within a certain wavelength range.

DESCRIPTION OF THE PRIOR ART

During the last decade the above-mentioned technical field has been the subject of a very rapid growth. As portable mobile telephones have become more compact and useful, they have gained popularity, and today mobile telephones are used by a major portion of the population in many countries.

A problem with the compact and low-weight mobile telephones of today is the signal degradation, which occurs during calls due to the mobile telephone antenna being located proximate to the user's body, the hand and the head in particular. This interaction between the body and the near field of the antenna will normally cause deteriorated antenna properties, mainly because of reflections and absorption losses. The shorter the distance is between the antenna and the user, the larger becomes the signal degradation. This means that requirements for satisfactory antenna efficiency are difficult to fulfil together with requirements for physical compactness and robustness.

Modern mobile telephones often use quarterwave type antennas in addition to, or as replacement for, longer halfwave type antennas. Quarterwave antennas have the advantage of a compact and robust size, particularly if the antenna is realized as a helix antenna. A feature of quarterwave antennas is that they generate electric currents in and/or on the mobile telephone chassis. Since the chassis has conductive properties—for practical reasons the chassis is produced from metal or metallized plastics—such chassis currents themselves generate electromagnetic fields, wherein the antenna efficiency is reduced because of the interaction with the user, as described above.

A high antenna efficiency is desired not only because the communication quality is improved, for instance as an increased signal-to-noise ratio, but also because this provides for a lower power consumption and consequently prolonged usage time as well as reduced heat generation. In order to improve the antenna efficiency it is previously known to maximize the distance between the antenna and the user's head. One example is given in JP-A-7212822 and in EP-A-0 689 297, in which an antenna is arranged on top of a longside of the mobile telephone, while a speaker and a microphone are arranged at an opposite longside. Thus, the telephone is intended to be held in such a way, that the longside with the speaker and the microphone is in contact with the user's head, while the opposite longside with the antenna will be relatively far from the user.

DE-A-43 00 705 discloses a portable telephone, wherein a conductive plate is arranged to act as a virtual ground plane for preventing high-frequency currents from being generated in the telephone body.

Furthermore, it is known to provide the mobile telephone with means for screening, absorbing or reflecting electromagnetic radiation. Such means may be arranged along the side of the antenna facing the user, and also on or inside the telephone chassis. Examples of previously known radio telephones of this kind are disclosed in U.S. Pat Nos. 5,493,704, 5,335,366, WO95/31048 and JP-A-7123463.

SUMMARY OF THE INVENTION

A main object of the present invention is to provide a radio telephone with high antenna efficiency by reducing the electrical energy losses and minimizing the interaction between antenna and user, without limiting the opportunities to realize the radio telephone in a compact size and with an antenna well suited for communication.

A further object of certain embodiments of the invention is to provide a compact radio telephone with a large space for display and keypad.

The above-mentioned main object is achieved by a radio telephone, preferably for cellular telecommunication, comprising an apparatus housing and at least one antenna, which is mounted on or in connection with the apparatus housing for performing the wireless communication of the radio telephone by transmitting and receiving radio frequent electromagnetic waves in a certain wavelength range, wherein a current-reducing means is mounted to the apparatus housing between the antenna and the side of the radio telephone, which normally is in contact with a human user, the current-reducing means having conductive as well as dielectric properties and being arranged to reduce or eliminate electric currents present in and/or on the apparatus housing between the antenna and said side of the radio telephone.

Preferred embodiments of the invention are defined by the subsequent dependent claims.

BRIEF DESCRIPTION OF THE DRAWINGS

The invention will be described in more detail in the following, reference being made to the accompanying drawings, in which.

DETAILED DISCLOSURE OF THE INVENTION

Figure 1:
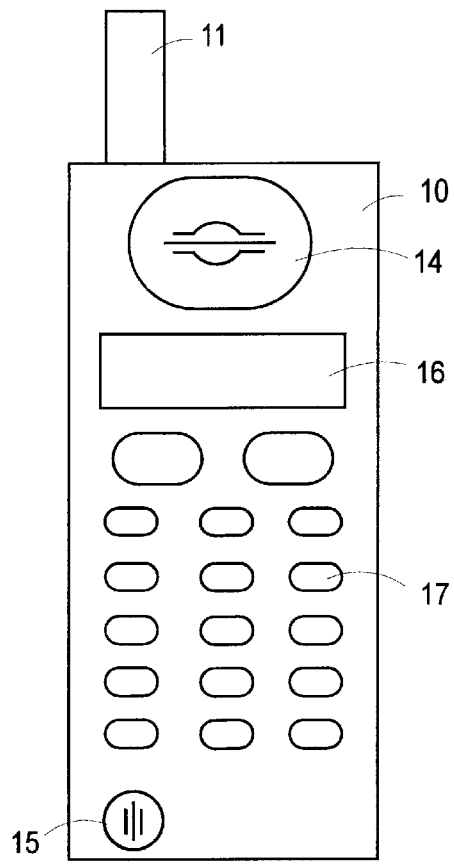
FIG. 1 is a schematic front view of a portable radio telephone according to the prior art.
Figure 2:
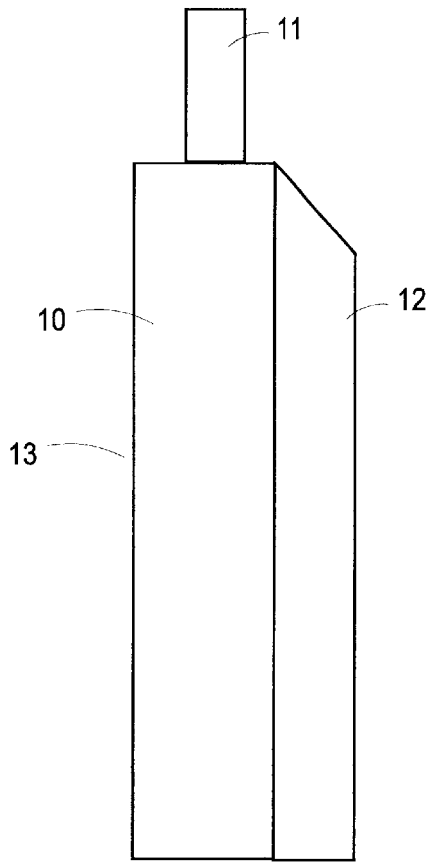
FIG. 2 is a side view of the prior art radio telephone according to FIG. 1, FIG. 3 schematically illustrates the use of the radio telephone according to FIGS. 1 and 2.

As an introduction the problems and drawbacks described above when using a typical radio telephone of conventional design will be discussed with reference to FIGS. 1–3. The known radio telephone comprises an apparatus housing 10, an antenna 11, a battery 12, a loudspeaker 14, a microphone 15, a display 16, and a keypad 17. The antenna 11 is mounted on top of the radio telephone and may be a quarterwave antenna, thus offering the advantage of a compact size. The loudspeaker 14 as well as the microphone 15 are arranged on the front side 13 of the radio telephone, thereby limiting the available space for the keypad 17 and—in particular—the display 16.

Figure 3:
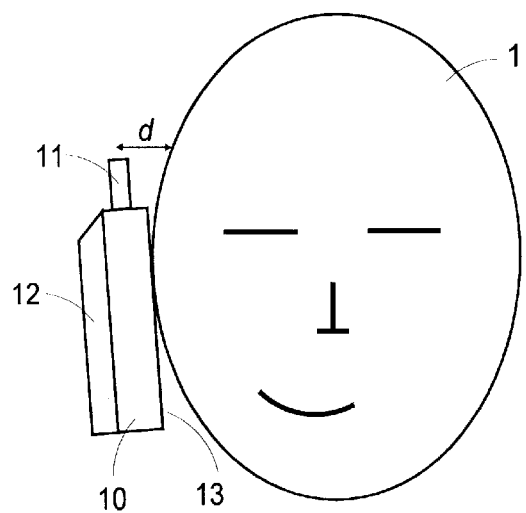

According to FIG. 3 the radio telephone is intended to be used by a user 1 for wireless communication with the rest of the world. During ongoing calls the front side 13 of the radio telephone is in contact with the head of the user. Thus, due to the design described above the distance d between the antenna 11 and the head 1 is quite short, thereby causing a signal degradation, which is not negligible but which on the contrary is considerable. In reality the distance d may be as short as about 10 mm. In situations where the antenna 11 is a quarterwave type antenna, the problem is emphasized due to the electric currents generated in the chassis, as described above.

Figure 4:
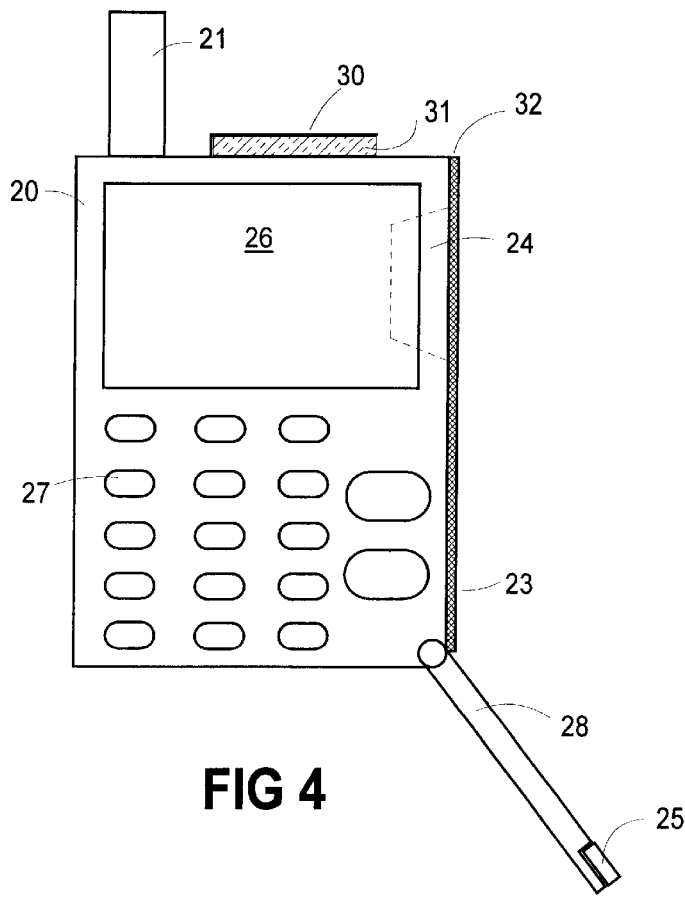
FIG. 4 is a schematic front view of a portable radio telephone according to a preferred embodiment of the invention.
Figure 5:
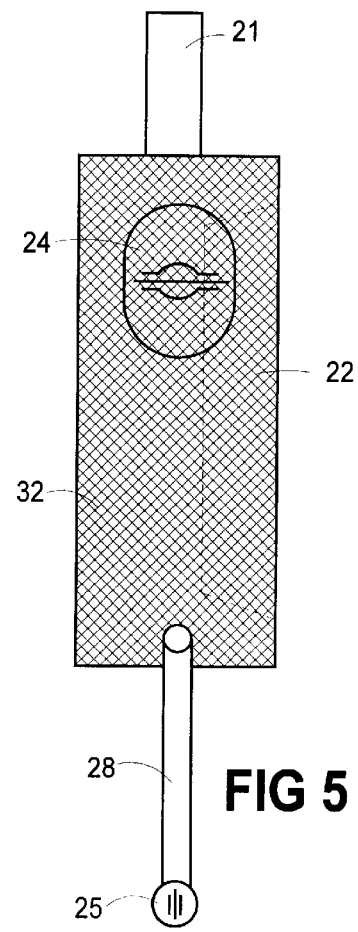
FIG. 5 is a side view of the radio telephone according to FIG. 4.
Figure 6:
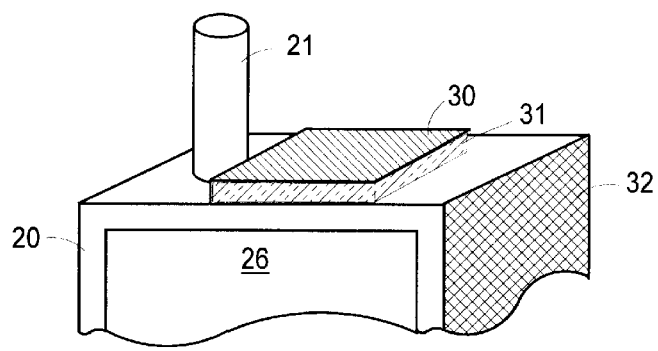
FIG. 6 is a perspective view of an upper portion of the radio telephone according to FIGS. 4 and 5, FIG. 7 schematically illustrates a current-reducing means, which is arranged in the radio telephone according to the invention, and FIG. 8 schematically illustrates the use of the radio telephone according to the invention.

In FIG. 4 a front view of a radio telephone according to a preferred embodiment of the invention is shown. FIG. 5 illustrates a side view of the radio telephone, and FIG. 6 is a perspective view of an upper portion of the radio telephone. The radio telephone comprises an apparatus housing 20, on top of which an antenna 21 is arranged. The antenna 21 has a design known per se, preferably a quarter-wave type design, and is located proximate to a first longside of the apparatus housing 20. The apparatus housing consists of an appropriate material, such as metal or metallized plastics, the purpose of which, among other things, is to protect the internal components of the radio telephone against external influence, to provide a convenient "handle" for the user and to act as a chassis for other components. Furthermore, the radio telephone comprises a display 26 and a keypad 27, which are known per se and which are arranged on the front side of the radio telephone. A battery 22 is arranged in the rear portion of the radio telephone, as schematically indicated by dashed lines in FIG. 5.

Figure 8:
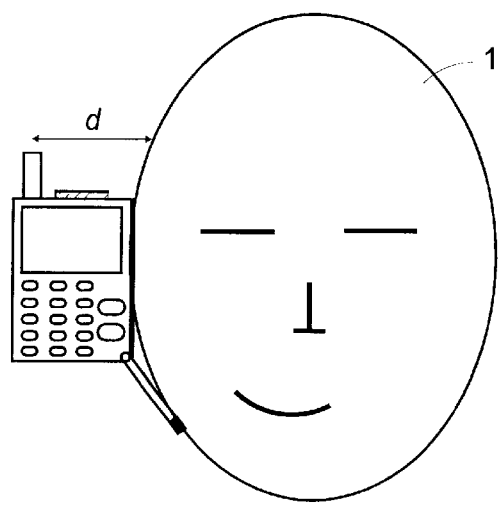

Unlike the conventional design described above the loudspeaker 24 as well as the microphone 25 are according to the preferred embodiment arranged at a second longside 23 of the radio telephone. This second longside 23 is located opposite to the first longside, at which the antenna 21 is arranged. The microphone 25 is mounted at the end of a whip element 28, which may be extended from the radio telephone. According to FIG. 8 this arrangement provides a considerably longer distance d between the antenna 21 and the user 1, when the user holds the radio telephone against his head during calls. The arrangement has the further advantage of allowing a larger area for the display 26 in particular. The display 26 may be made at least twice as big as the display 16 in the conventional telephone according to FIGS. 1–3, thereby providing important advantages as regards user-friendliness. Besides the opportunity of having more and/or longer lines of text—or a larger character size—the display may be of a graphic kind rather than solely character-based.

The most important feature of the present invention is that a current-reducing means has been arranged at the apparatus housing 20 between the antenna 21 and said second side 23 of the radio telephone. The purpose of this means is to reduce or eliminate chassis currents present in the apparatus housing so as to minimize the electrical energy losses. Such chassis currents are otherwise frequently occuring, particularly if the antenna is of quarterwave length. According to the preferred embodiment of the invention the current-reducing means is constituted by a quarterwave plate, comprising an element 30 of metal or other electrically conductive material with an approximatively L-shaped cross section (cf. FIGS. 4 and 7). A slot is formed between the upper portion of the element 30 and underlying parts of the apparatus housing 20.

Figure 7:
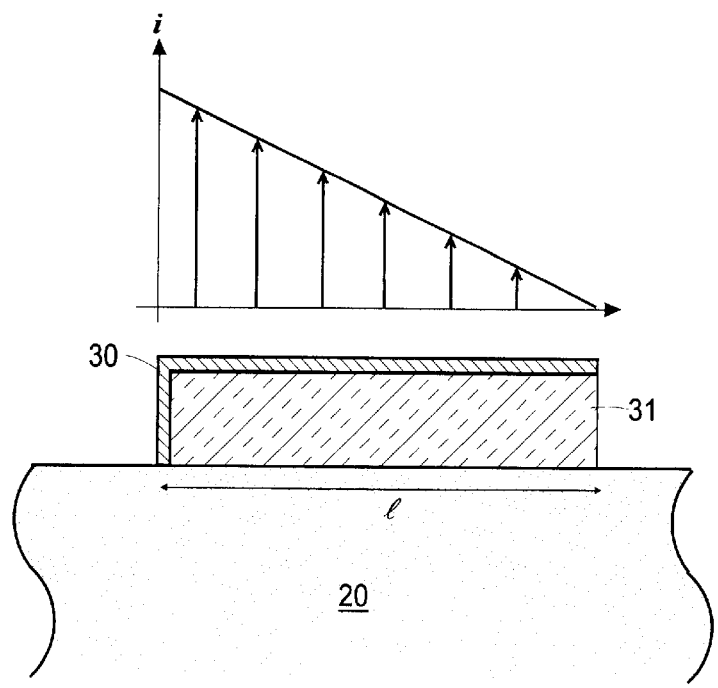

The quarterwave plate is schematically illustrated in FIG. 7. The plate has the characterizing feature of acting as a band-stop filter for an electric current i in a certain frequency range. If the length l corresponds to one quarter of the wavelength at the carrier frequency of the signal transmitted by the antenna, a standing-wave phenomenon occurs in the quarterwave plate, when an electric current originating from the quarterwave antenna flows through the plate. Thanks to the standing-wave the impedance becomes almost infinitely large, thereby more or less completely cutting off the current. This is schematically illustrated in a current profile diagram in the upper part of FIG. 7, from which it appears that the current magnitude i becomes weaker and weaker along the longitudinal extension of the quarterwave plate and almost completely disappears at the far end (the rightmost end in the drawing) of the quarterwave plate.

In a mobile telecommunications system such as GSM carrier frequencies of around 900 MHz are used, which correspond to a quarterwave length of slightly more than 8 cm. However, to have a 8 cm long quarterwave plate arranged on or in the apparatus housing of a modern radio telephone would be clearly inappropriate, since this would severely restrict the opportunities of a compact apparatus design. According to the preferred embodiment of the invention a dielectric element 31 is therefore arranged in the slot, which is formed between the upper portion of the metal element 30 and underlying parts of the apparatus housing. The dielectric element 31 has a relative dielectric constant $\in_r$, which is greater than 1, and hence the length l of the metal element 30 may be drastically reduced with preserved current-reducing effect in the wavelength range in question. More specifically, the necessary length l decreases a factor $$(1/\sqrt{\varepsilon_r})$$

according to the formula $$l = \frac{\lambda/4}{\sqrt{\varepsilon_r}},$$

where λ represents the wavelength at a given carrier frequency.

According to the preferred embodiment the dielectric element 31 has a relative dielectric constant $\in_r \approx 10$, yielding l≈2.6 cm.

The current-reducing means 30, 31 may be arranged on top of the apparatus housing 20, as is indicated in the drawings, or be molded into it.

Further measures have been taken according to the preferred embodiment so as to reduce unnecessary electric chassis currents. Hence, the longside 23 of the radio telephone (the side which during normal use of the radio telephone faces or contacts the cheek of the user 1) is covered with a layer 32 of a material, which is capable of reducing such chassis currents. Preferably a composite material like ECCOSORB® is used, which is commercially available from Grace Electronic Materials (Grace N.V.), Nijverheidsstraat 7, 2260 Westerlo, Belgium. The properties of this material family are known per se in various microwave applications, and consequently they are not described in more detail herein. As an alternative to an outer layer 32 the current-reducing material may be integrated with the chassis plastic material.

In summary, according to the preferred embodiment described above, which comprises a) means 30, 31 for reducing chassis currents, b) the arrangement of the loudspeaker 24 and the microphone 25 at a longside 23 of the radio telephone and c) a layer 32 of current-reducing material at said longside, a radio telephone is obtained, where the distance d between the antenna 21 and the user 1 is maximized and where the electrical energy losses are minimal. This provides advantages such as improved antenna efficiency, higher signal-to-noise ratio and reduced battery consumption. The arrangement has the further advantages of improved communication properties (minimized interaction between the antenna and the user) as well as improved user-friendliness (a large and informative display).

The invention has been described above by way of a preferred embodiment. This disclosure has illustrating but not limiting purposes. On the contrary, the invention may be realized in several ways within the protectional scope of the invention, as defined by the appended independent patent claims.

What is claimed is:

1. A radio telephone, preferably for cellular telecommunications, comprising an apparatus housing and at least one antenna, which is mounted to or in connection with the apparatus housing for performing the wireless communication of the radio telephone by transmitting and receiving radiofrequent electromagnetic waves in a given wavelength range, characterized by a current-reducing means, which is arranged at the apparatus housing between the antenna and a side of the radiotelephone, which during normal use faces a human user, said current-reducing means having conductive as well as dielectric properties and being arranged to reduce or eliminate electric currents present in and/or on the apparatus housing between the antenna and said side of the radio telephone, wherein the current-reducing means is a quarterwave plate and that the quarterwave plate comprises a metal element with essentially L-shaped cross-section, a slot being formed between an upper portion of the metal element and underlying parts of the apparatus housing, and wherein a dielectric element is arranged in said slot.

2. A radio telephone according to claim 1, characterized in that the length l of the metal element (30) and the value of the relative dielectric constant $\in_r$ of the dielectric element (31) are selected to fulfil $$l \cong \frac{\lambda/4}{\sqrt{\varepsilon_r}},$$

where $\lambda$ represents a wavelength in said wavelength range.

3. A radio telephone according to claim 1, characterized in that the side (23) facing the user (1) is covered with a layer (32) of a material, which is capable of reducing electric currents present in and/or on the apparatus housing.

4. A radio telephone according to claim 1, characterized by: a loudspeakeer (24) and a microphone (25), which are arranged at a first long-side (23) of the radio telephone; an antenna (21), which is arranged at an opposite second longside, at an upper side or at a lower side of the radio telephone; and a display (26) and a keypad (27), which are arranged at another side—preferably a front side—different from said sides of the radio telephone.

* * * * *